(12) United States Patent
Otomo et al.

(10) Patent No.: US 9,635,671 B2
(45) Date of Patent: Apr. 25, 2017

(54) SCHEDULING METHOD

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Kawasaki (JP); Hiromasa Yamauchi, Kawasaki (JP); Koji Kurihara, Kawasaki (JP); Tetsuo Hiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 381 days.

(21) Appl. No.: 13/941,146

(22) Filed: Jul. 12, 2013

(65) Prior Publication Data

US 2013/0303221 A1 Nov. 14, 2013

Related U.S. Application Data

(63) Continuation of application No. PCT/JP2011/050484, filed on Jan. 13, 2011.

(51) Int. Cl.
*H04B 7/00* (2006.01)
*H04W 72/04* (2009.01)
*G06F 9/50* (2006.01)
*H04W 72/12* (2009.01)
*G06F 9/48* (2006.01)

(52) U.S. Cl.
CPC ........ *H04W 72/048* (2013.01); *G06F 9/5072* (2013.01); *G06F 9/5094* (2013.01); *H04W 72/1284* (2013.01); *G06F 9/4856* (2013.01); *G06F 2209/502* (2013.01); *G06F 2209/5017* (2013.01); *Y02B 60/142* (2013.01)

(58) Field of Classification Search
CPC ................ Y02B 60/142; Y02B 60/144; G06F 2209/5017; G06F 2209/502; G06F 9/4856; G06F 9/4881; G06F 9/5072; G06F 9/5094; H04W 72/048; H04W 72/1284
See application file for complete search history.

(56) References Cited

U.S. PATENT DOCUMENTS

2004/0156487 A1* 8/2004 Ushiki .................... H04L 67/18
379/88.22

FOREIGN PATENT DOCUMENTS

| JP | 2006-201896 A | 8/2006 |
|---|---|---|
| JP | 2007-087273 A | 4/2007 |
| JP | 2007-116330 A | 5/2007 |
| JP | 2007-241394 A | 9/2007 |
| JP | 2008-226023 A | 9/2008 |

* cited by examiner

*Primary Examiner* — Mohammed Rachedine
(74) *Attorney, Agent, or Firm* — Arent Fox LLP

(57) ABSTRACT

A scheduling method includes acquiring first information, second information, and third information from a first terminal located in a service area of a first base station; determining based on the first information, the second information, and the third information, whether a first process assigned to the first terminal is to be collected; and assigning the first process to a second terminal located in the service area of the first base station, when at the determining the first process is determined to be collected.

9 Claims, 14 Drawing Sheets

FIG.4

| TERMINAL ID | STATUS | CONNECTION DESTINATION BASE STATION | NEGOTIATION INFORMATION | AMOUNT OF REMAINING BATTERY POWER | COMMUNICATION QUALITY |

26

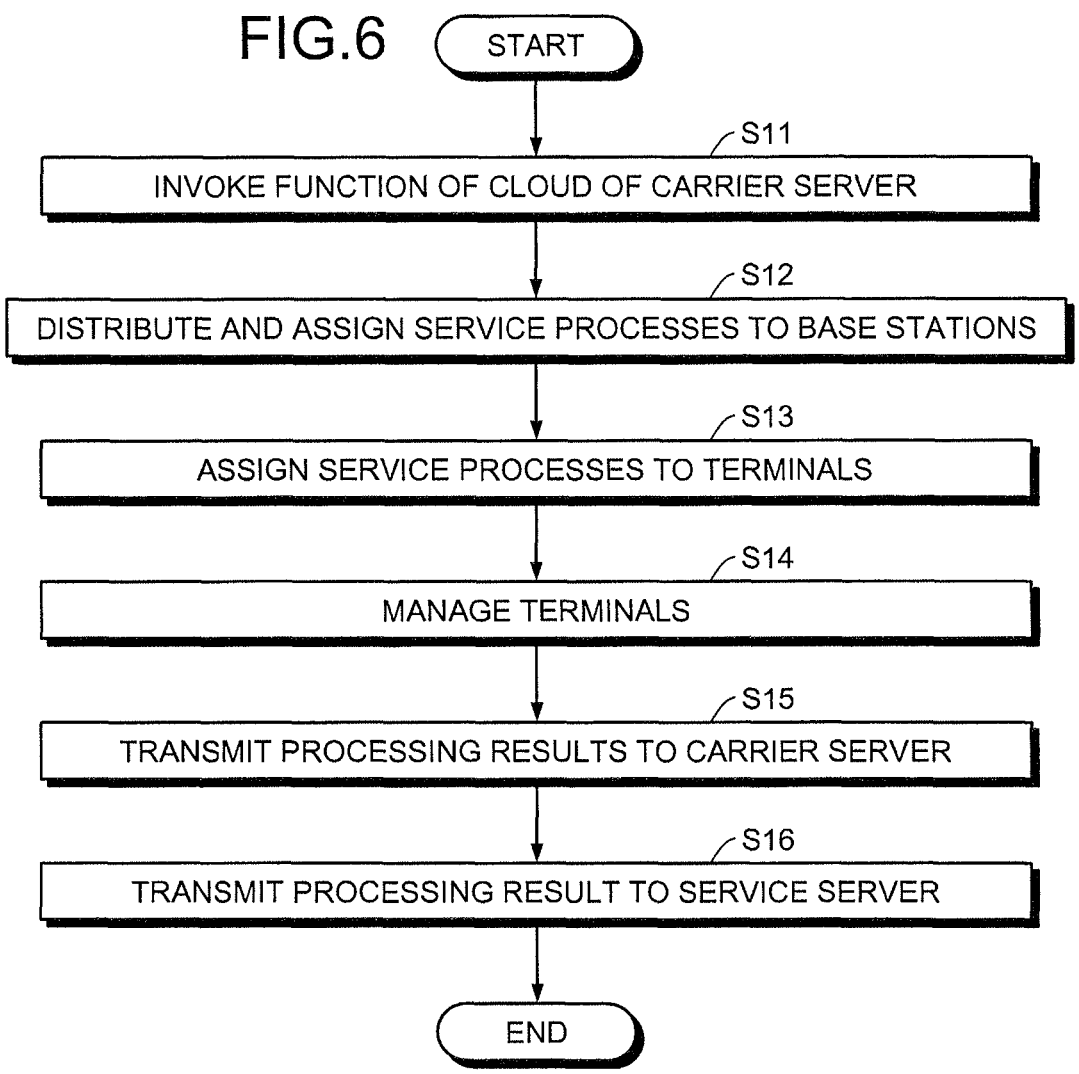

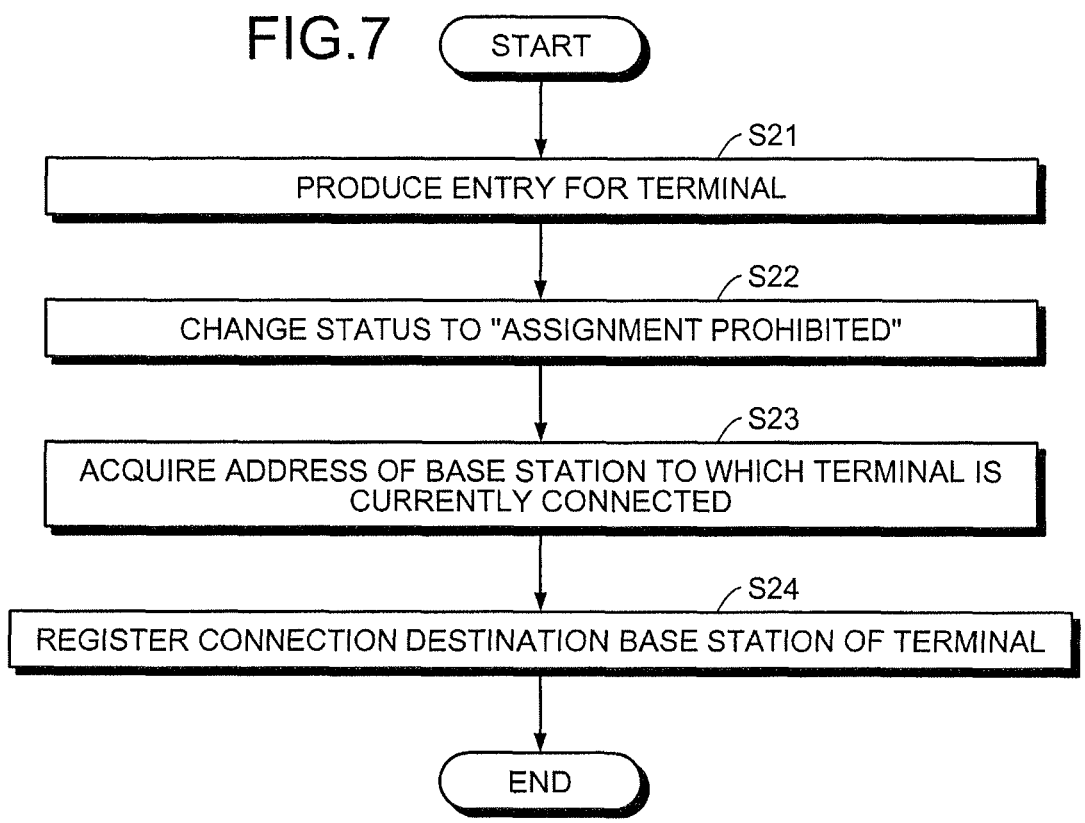

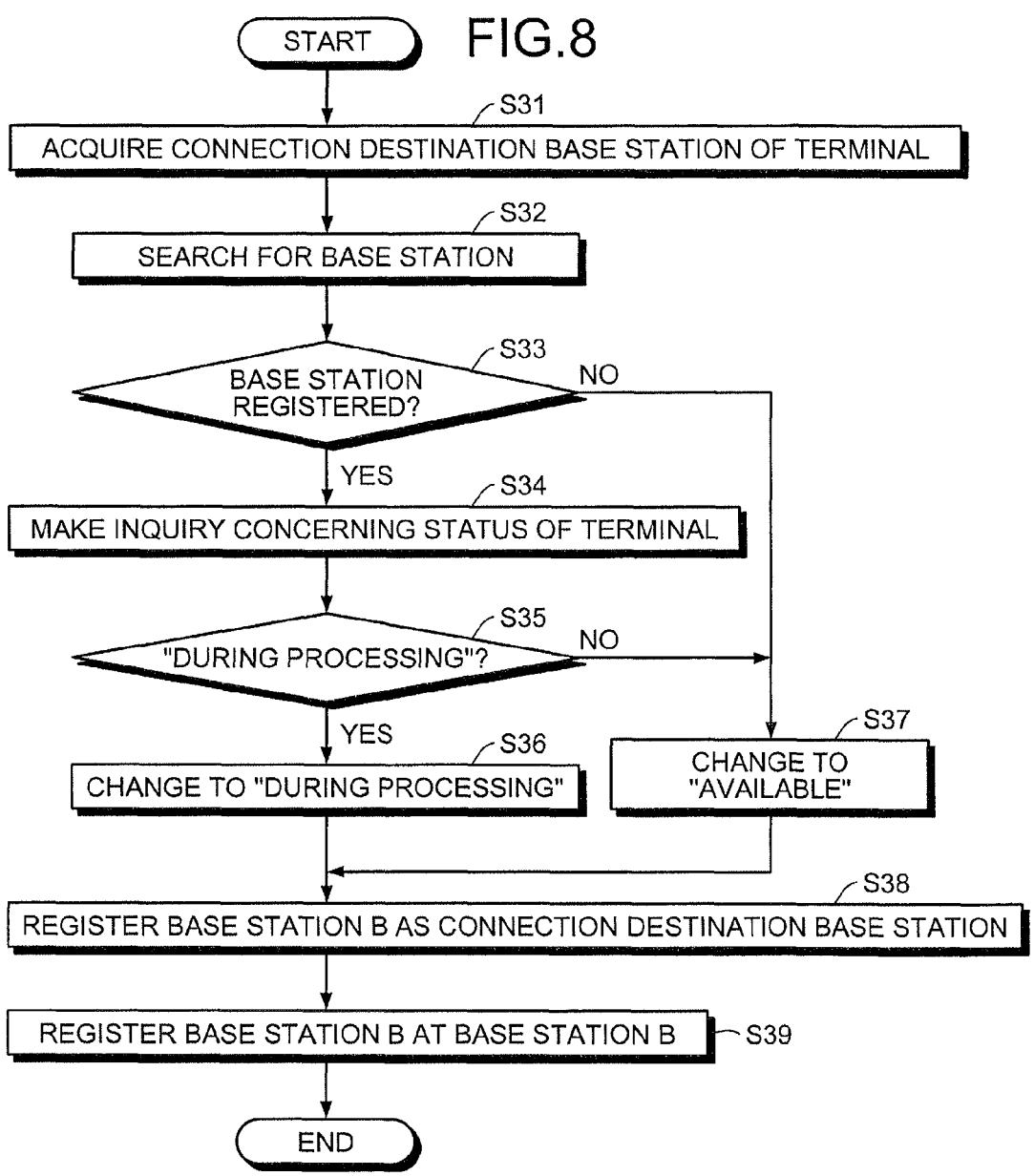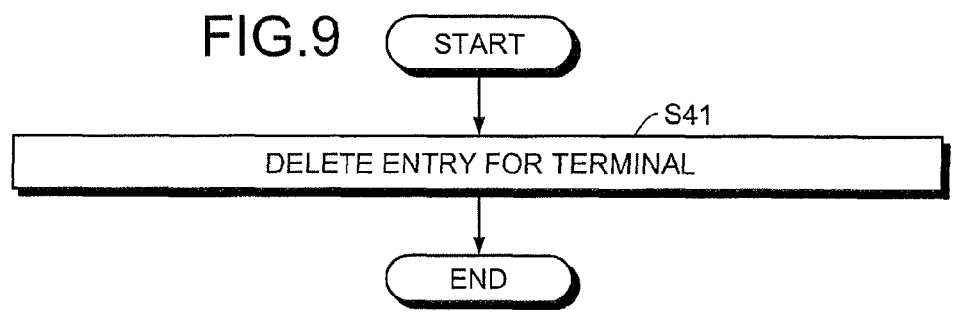

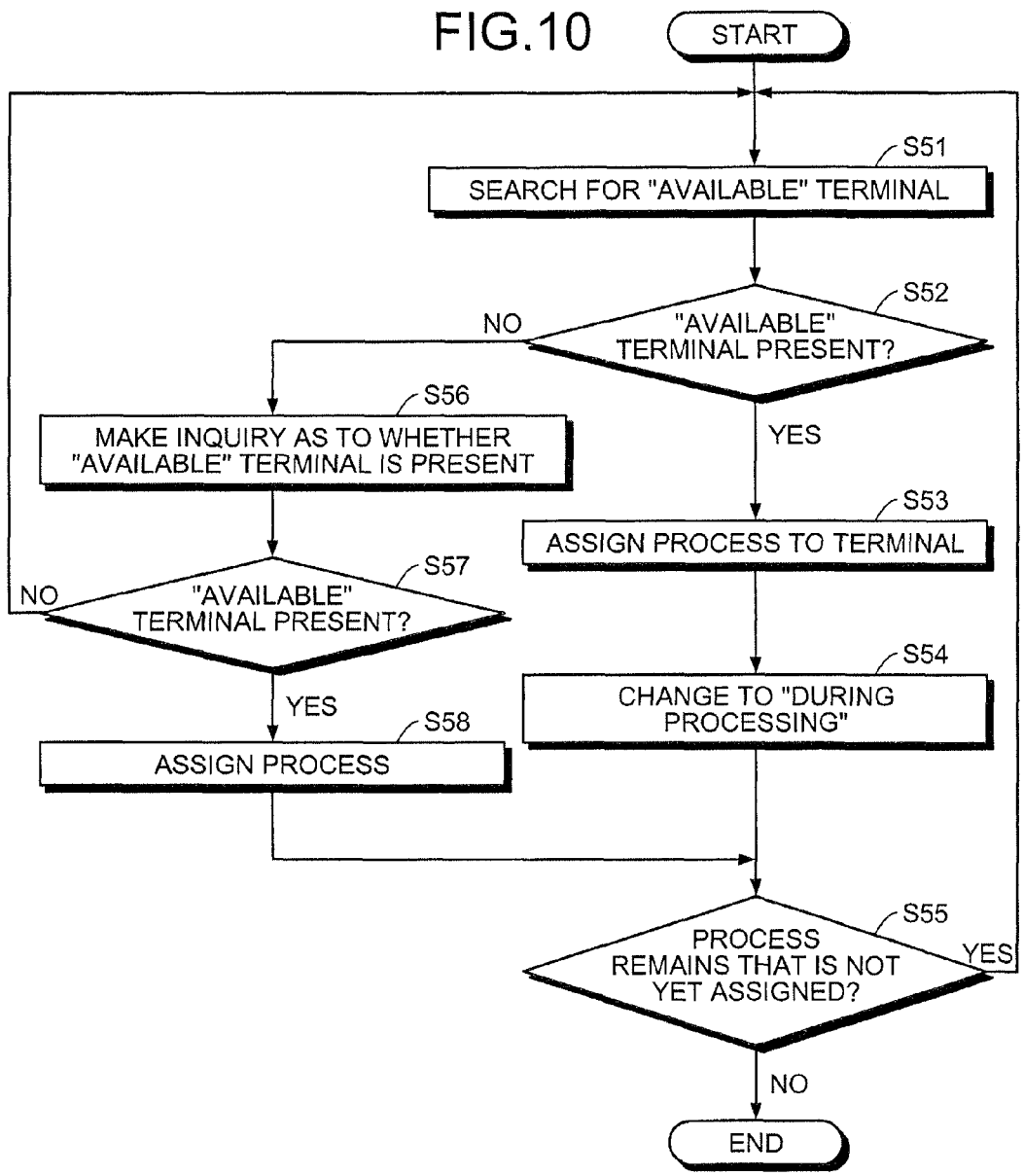

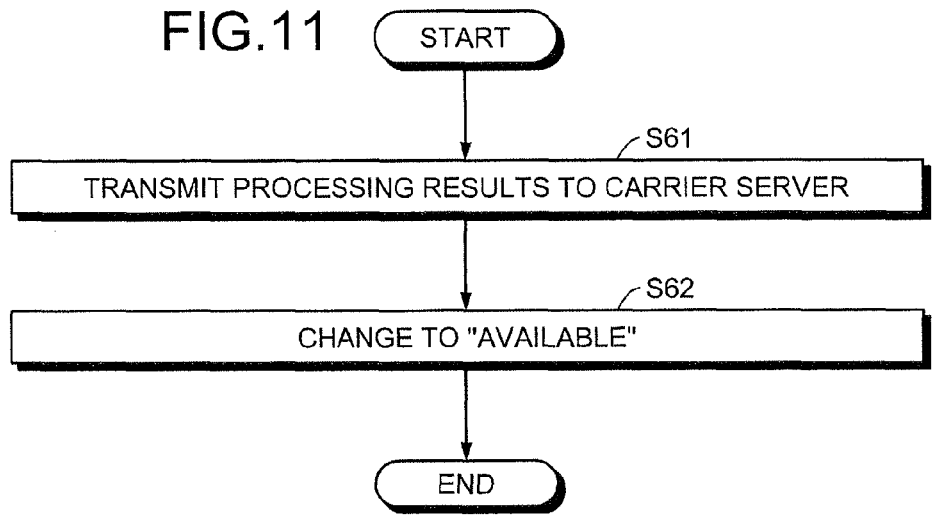
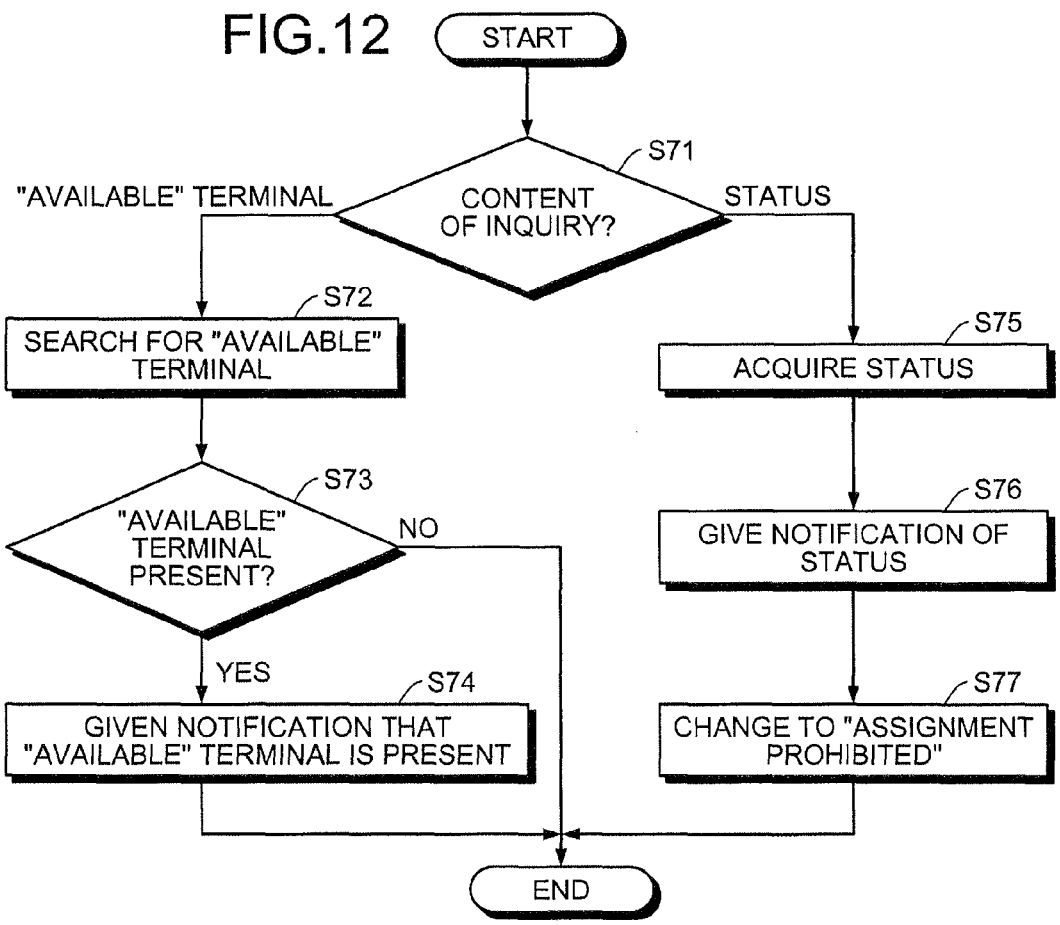

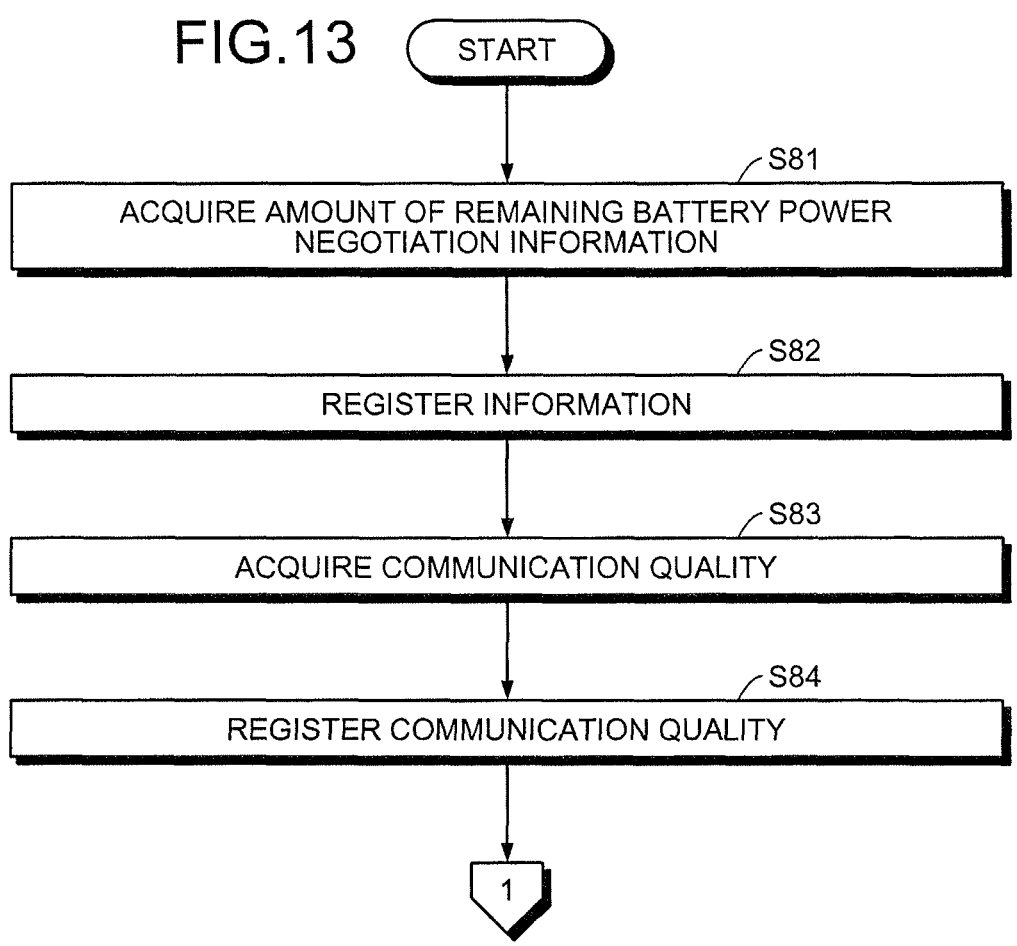

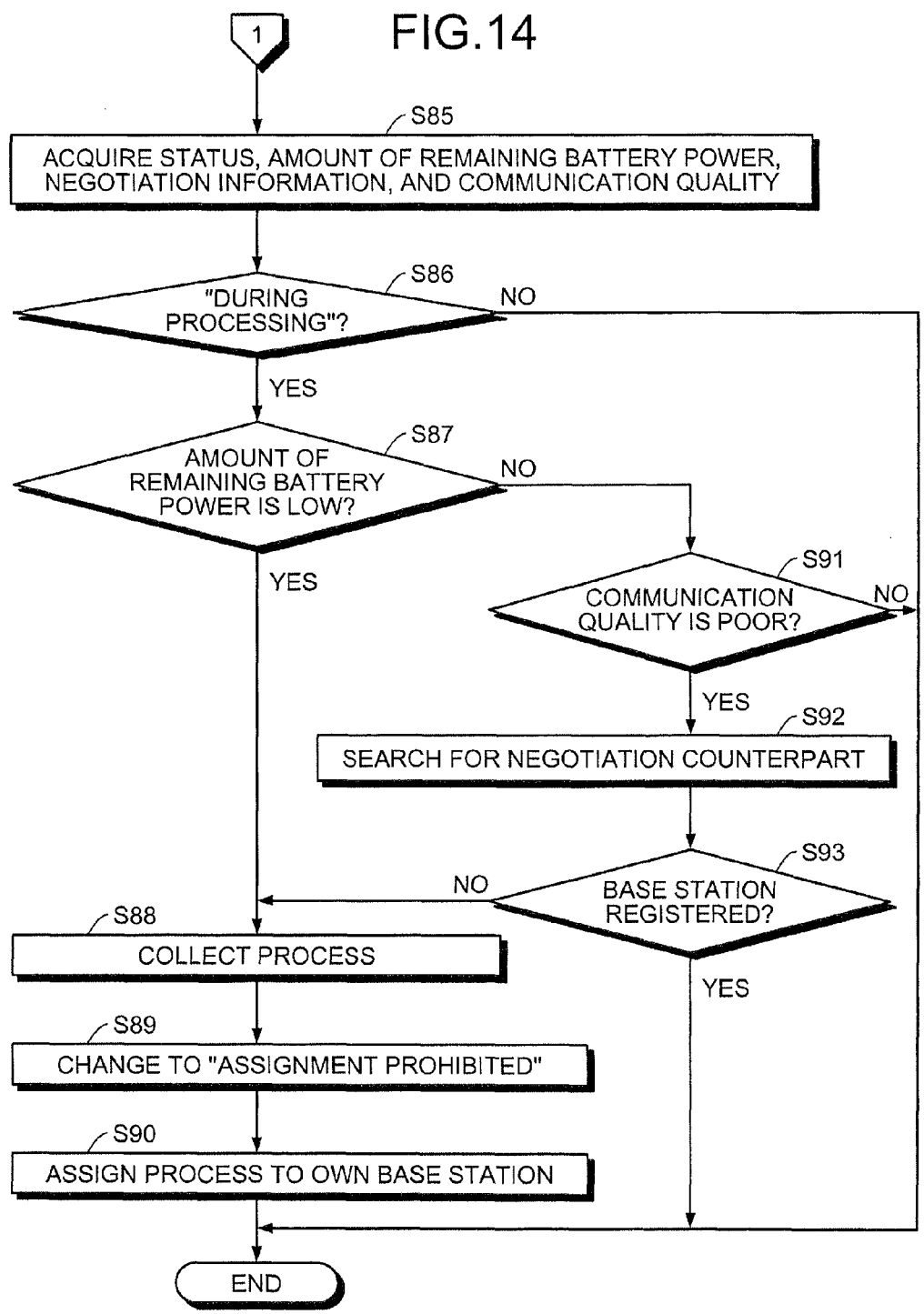

FIG.15

| | | | | | | |
|---|---|---|---|---|---|---|
| BASE STATION A | "DURING PROCESSING" | BASE STATION A | BASE STATION A | 80% | 10 Mbps | ⌐51 |
| BASE STATION B | - | - | - | - | - | |

⌐52

| | | | | | | |
|---|---|---|---|---|---|---|
| BASE STATION A | "DURING PROCESSING" | BASE STATION A | BASE STATION B | 80% | 3 Mbps | ⌐53 |
| BASE STATION B | "ASSIGNMENT PROHIBITED" | BASE STATION A | - | - | - | |

⌐54

| | | | | | | |
|---|---|---|---|---|---|---|
| BASE STATION A | "ASSIGNMENT PROHIBITED" | BASE STATION A | BASE STATION B | 80% | 1 Mbps | ⌐55 |
| BASE STATION B | "ASSIGNMENT PROHIBITED" | BASE STATION A | BASE STATION B | 80% | 1 Mbps | |

⌐56

| | | | | | | |
|---|---|---|---|---|---|---|
| BASE STATION A | "ASSIGNMENT PROHIBITED" | BASE STATION B | BASE STATION B | 80% | 0.1 Mbps | ⌐57 |
| BASE STATION B | "AVAILABLE" | BASE STATION B | BASE STATION B | 80% | 3 Mbps | |

⌐58

| | | | | | | |
|---|---|---|---|---|---|---|
| BASE STATION A | - | - | - | - | - | ⌐59 |
| BASE STATION B | "AVAILABLE" | BASE STATION B | BASE STATION B | 80% | 10 Mbps | |

| | | | | | | |
|---|---|---|---|---|---|---|
| BASE STATION A | "DURING PROCESSING" | BASE STATION A | BASE STATION A | 80% | 10 Mbps | 71 |
| BASE STATION B | - | - | - | - | - | |

72

| | | | | | | |
|---|---|---|---|---|---|---|
| BASE STATION A | "DURING PROCESSING" | BASE STATION A | BASE STATION B | 80% | 3 Mbps | 73 |
| BASE STATION B | "ASSIGNMENT PROHIBITED" | BASE STATION A | - | - | - | |

74

| | | | | | | |
|---|---|---|---|---|---|---|
| BASE STATION A | "DURING PROCESSING" | BASE STATION A | BASE STATION B | 80% | 1 Mbps | 75 |
| BASE STATION B | "ASSIGNMENT PROHIBITED" | BASE STATION A | BASE STATION B | 80% | 1 Mbps | |

76

| | | | | | | |
|---|---|---|---|---|---|---|
| BASE STATION A | "DURING PROCESSING" | BASE STATION B | BASE STATION B | 80% | 0.1 Mbps | 77 |
| BASE STATION B | "DURING PROCESSING" | BASE STATION B | BASE STATION B | 80% | 3 Mbps | |

78

| | | | | | | |
|---|---|---|---|---|---|---|
| BASE STATION A | - | - | - | - | - | 79 |
| BASE STATION B | "DURING PROCESSING" | BASE STATION B | BASE STATION B | 80% | 10 Mbps | |

80

SCHEDULING METHOD

CROSS REFERENCE TO RELATED APPLICATIONS

This application is a continuation application of International Application PCT/JP2011/050484, filed on Jan. 13, 2011 and designating the U.S., the entire contents of which are incorporated herein by reference.

FIELD

The embodiments discussed herein are related to a scheduling method.

BACKGROUND

Grid computing systems are conventionally known. In a grid computing system, plural computers connected through networks perform processes in parallel. A technique is present of implementing a grid computing system using a mobile communication system.

A distributed processing system is present that includes a base station and an on-vehicle terminal that can be connected to each other by radio communication. In the distributed processing system, the on-vehicle terminal acquires position information and a scheduled running route of the on-vehicle terminal, and the service area of the base station; and based on the acquired information, estimates whether the on-vehicle terminal is located within the service area of the base station. When the on-vehicle terminal estimates that the on-vehicle terminal is located within the service area of the base station, the on-vehicle terminal prepares for registration of the on-vehicle terminal into the distributed processing system. According to a movement direction notifying method, when the location of a communication terminal apparatus can not be identified, it is determined that the communication terminal apparatus is located outside a service area; the movement direction of the communication terminal apparatus after the communication terminal apparatus has moved outside the service area is estimated based on time information and position information of the communication terminal apparatus; and information concerning the movement direction of the communication terminal apparatus is reported to another communication terminal apparatus that requests connection to the communication terminal apparatus whose location is determined to be outside the service area (see, e.g., Japanese Laid-Open Patent Publication Nos. 2007-87273 and 2007-116330).

In the grid computing system, when the computers executing the parallel processing are each a mobile terminal such as an on-vehicle terminal or a mobile telephone, the base station communicating with the mobile terminal has to collect from the mobile terminal getting out of the service area of the base station, the process that is assigned to the mobile terminal. The base station has to assign the collected process to another mobile terminal located within the service area of the base station and cause the other mobile terminal to continue the execution of the process. However, many processes are necessary for assigning the process to the mobile terminal and collecting the process from the mobile terminal and therefore, the overhead becomes large. Consequently, a problem arises in that the efficiency of the distributed processing is degraded.

SUMMARY

According to an aspect of an embodiment, a scheduling method includes acquiring first information, second information, and third information from a first terminal located in a service area of a first base station; determining based on the first information, the second information, and the third information, whether a first process assigned to the first terminal is to be collected; and assigning the first process to a second terminal located in the service area of the first base station, when at the determining the first process is determined to be collected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram of an example of a record of a terminal management database of the base station according to the second example;

FIG. 6 is a flowchart of distributed processing in the scheduling method according to the second example;

FIG. 7 is a flowchart of a registration process for the terminal in the scheduling method according to the second example;

FIG. 8 is a flowchart of a status updating process for the terminal in the scheduling method according to the second example;

FIG. 9 is a flowchart of a deletion process of the terminal in the scheduling method according to the second example;

FIG. 10 is a flowchart of an assignment process for a process in the scheduling method according to the second example;

FIG. 11 is a flowchart of a reception process for receiving a processing result in the scheduling method according to the second example;

FIG. 12 is a flowchart of a response process for responding to an inquiry in the scheduling method according to the second example;

FIGS. 13 and 14 are flowcharts of a collection process for collecting an assigned process in the scheduling method according to the second example;

FIG. 15 is a schematic diagram of an example of the terminal management database for the collection of a process in the scheduling method according to the second example; and FIG. 16 is a schematic diagram of an example of the terminal management database for a case where the process is not collected in the scheduling method according to the second example.

DESCRIPTION OF EMBODIMENTS

Examples of a scheduling method according to an embodiment will be described in detail with reference to the accompanying drawings. The scheduling method according to the embodiment is a method in which based on information acquired from a terminal located within a service area of a base station, whether a process assigned to the terminal is to be collected is determined; and if the process is to be collected, the collected process is assigned to another terminal located within the service area of the base station. Nonetheless, the scheduling method is not limited to the examples.

Figure 1:
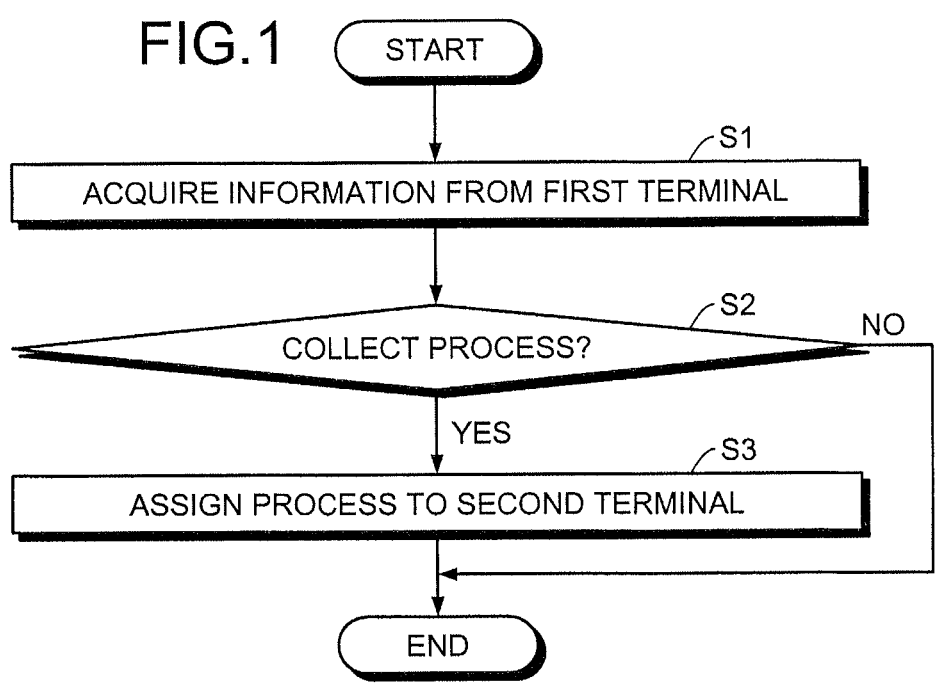
FIG. 1 is a flowchart of a scheduling method according to a first example.

FIG. 1 is a flowchart of a scheduling method according to a first example. As depicted in FIG. 1, according to the scheduling method of the first example, an apparatus executing assignment and collection of a process such as, for example, a base station acquires first information, second information, and third information from a first terminal located within the service area of the base station (step S1). The apparatus executing the assignment and the collection of the process determines based on the acquired first, second, and third information whether a process assigned to the first terminal is to be collected (step S2). If the apparatus executing the assignment and the collection of the process determines that a process is to be collected (step S2: YES), the apparatus assigns the collected process to a second terminal located within the service area of the base station (step S3). The second terminal executes the assigned process. If the apparatus determines that no process is to be collected (step S2: NO), the first terminal continues the execution of the process.

According to the first example, the apparatus executing the assignment and the collection of a process determines based on the information acquired from the first terminal whether the process assigned to the first terminal is to be collected. Therefore, if the apparatus does not collect the process from the first terminal and the first terminal continues the execution of the process, no overhead is generated for the collection and the reassignment of the process. Therefore, drops in the efficiency of the execution of distributed processing using the plural mobile terminals can be suppressed.

Figure 2:
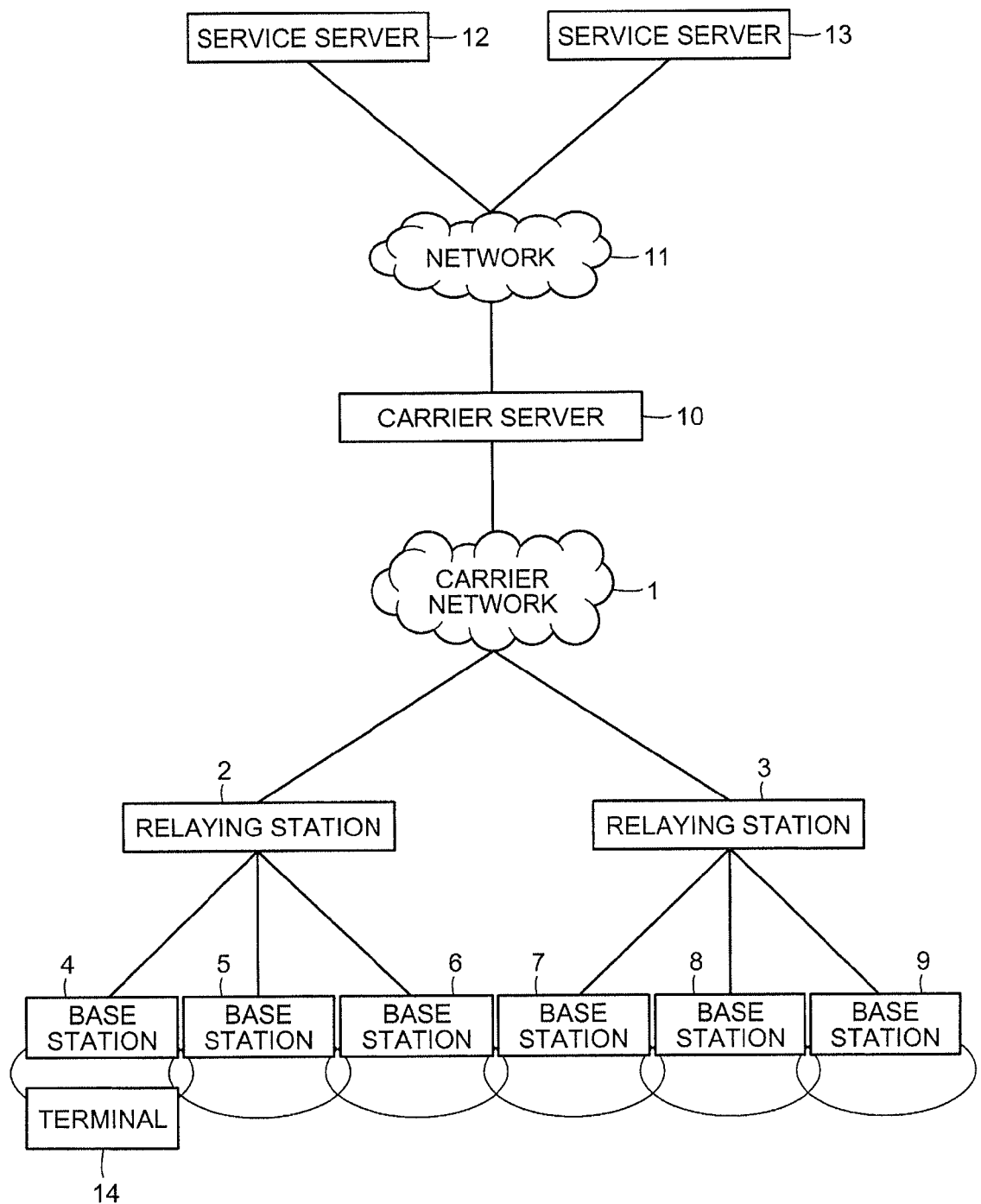
FIG. 2 is a block diagram of a mobile communication system to which the scheduling method according to a second example is applied.

FIG. 2 is a block diagram of a mobile communication system to which the scheduling method according to a second example is applied. As depicted in FIG. 2, in the mobile communication system according to the second example, plural higher-order stations that are, for example, relaying stations 2 and 3 are connected to a carrier network 1. Each of the relaying stations 2 and 3 is connected to, for example, one or more base stations 4 to 9. The plural base stations, for example, 4 to 6 connected to the relaying station 2 are included in the same group. The plural base stations, for example, 7 to 9 connected to the relaying station 3 are included in another group that is different from the group including the base stations 4 to 6.

The carrier network 1 is connected to, for example, a carrier server 10. The carrier server 10 is connected to, for example, a network 11. The network 11 is connected to, for example, one or more service server(s) 12 and 13. For example, services are provided from the service servers 12 and 13 to the base stations 4 to 9 through the network 11, the carrier server 10, the carrier network 1, and the relaying stations 2 and 3. The provided services are processed by plural terminals 14 (among which only one is depicted) via distributed processing. When the terminal 14 moves into the service areas of the base stations 4, 5, and 6, the terminal 14 continues to execute the process that is assigned thereto. The same applies to the group of the base stations 7 to 9.

Figure 3:
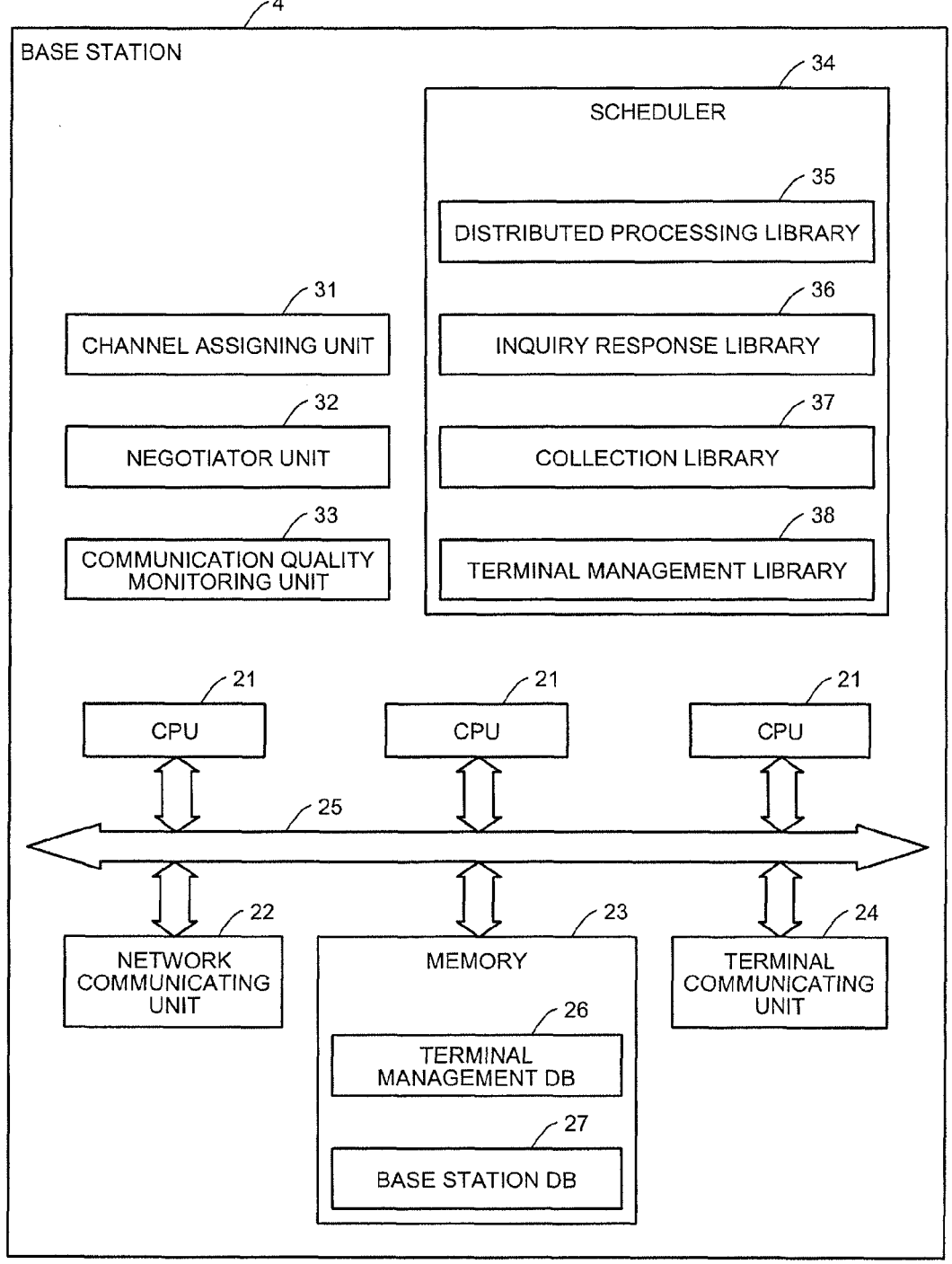
FIG. 3 is a block diagram of a base station according to the second example.

FIG. 3 is a block diagram of the base station according to the second example. The base stations 4 to 9 are of the same configuration and therefore, the configuration of the base station 4 alone will be described. As depicted in FIG. 3, the base station 4 is configured to, for example, include one or more central processing unit(s) (CPU(s)) 21, a network communicating unit 22, memory 23, and a terminal communicating unit 24, respectively connected through a bus 25.

The CPU 21 executes a program (not depicted) that is stored in the memory 23 and that implements functions of a base station. The network communicating unit 22 is an interface that supervises communications with the carrier network and communicates with, for example, the relaying station that is a higher-order station of the base station implemented by the CPU 21. The memory 23 includes memory that is writable and readable as necessary. The memory 23 stores, for example, a terminal management database (terminal management DB) 26 as terminal management memory and for example, a base station database (base station DB) 27 as base station memory.

The terminal management database 26 stores and manages information such as the states of the terminals managed by the base station 4 and the state of the process assignment. The base station database 27 stores information concerning other base stations that are connected to the same relaying station 2 as the base station 4 and that belong to the same group as the base station 4. The terminal communicating unit 24 is an interface that supervises communication with the terminals and communicates with the terminals.

The CPU 21 executes the program to implement the functions of a base station and thereby, implements a channel assigning unit 31, a negotiator unit 32, a communication quality monitoring unit 33, and a scheduler 34. The channel assigning unit 31 assigns a radio channel between the base station that the CPU 21 implements and a terminal. The negotiator unit 32 executes negotiations between the base station and the terminals. The communication quality monitoring unit 33 monitors the quality of the radio channels between the base station and the terminals by measuring, for example, the radio wave strength and the communication speed.

The scheduler 34 executes the scheduling of the assignment of processes to the terminals. The scheduler 34 includes a distributed processing library 35, an inquiry response library 36, a collection library 37, and a terminal management library 38. The distributed processing library 35 assigns the processes to the terminals, causes the terminals to execute the processes, and collects execution results of the processes. The inquiry response library 36 responds to various inquiries from the other base stations. The collection library 37 collects information concerning the terminals and collects the processes that are assigned to the terminals. The terminal management library 38 operates the terminal management database 26.

FIG. 4 is a schematic diagram of an example of a record of the terminal management database of the base station according to the second example. As depicted in FIG. 4, a record of the terminal management database 26 includes fields for a terminal identifier (ID), a status, a connection destination base station, negotiation information, the amount of remaining battery power, and the communication quality.

The base station 4 can identify each terminal based on the information stored in the terminal ID field. An example of the information stored in the terminal ID field can be, for example, subscriber identity module (SIM) information. The base station 4 can identify the state of the terminal as a calculation node, based on the information stored in the status field. For example, "available", "during processing", or "assignment prohibited" may be indicated as the status.

The base station 4 can identify the base station to which the terminal is connected, based on the information stored in the connection destination base station field. An example of the information stored in the connection destination base station field can be, for example, the address of the base station. The base station 4 can identify the base station with which the terminal executes a negotiation, based on the information stored in the negotiation information field. An example of the information stored in the negotiation information field can be, for example, the address of the base station. An example of the address of the base station can be, for example, an Internet protocol (IP) address.

The base station 4 can identify the amount of remaining battery power of the terminal, based on the information stored in the amount of remaining battery power field, and can identify the radio communication quality between the terminal and the base station, based on the information stored in the communication quality field. An example of the information stored in the communication quality field can be, for example, the radio wave strength and the communication speed of the radio channel between the terminal and the base station.

The base station 4 can identify other base stations in the same group as the base station 4, based on the information stored in the base station database 27. An example of the information stored in the base station database 27 can be, for example, the address of the base stations. An example of the address of the base station can be, for example, the IP address.

As an example, in the example depicted in FIG. 2, the base station database 27 of the base station 4 stores, for example, the IP addresses of the base stations 5 and 6; the base station database 27 of the base station 5 stores, for example, the IP addresses of the base stations 4 and 6; and similarly, the base station database 27 of the base station 7 stores, for example, the IP addresses of the base stations 8 and 9. Entries into the base station database 27 may be set by, for example, the relaying station 2 that is a higher-order station of the base station 4.

In a case where the terminal moves, if an entry for the base station to which the terminal moves is present in the base station database 27, the base station 4 does not collect any process from the terminal. For example, if the destination of the terminal communicating with the base station 4 is the base station 5 or 6, the base station 4 does not collect any process from the terminal. If the destination of the terminal communicating with the base station 4 is the base station 7, 8, or 9, the base station 4 collects a process from the terminal.

Figure 5:
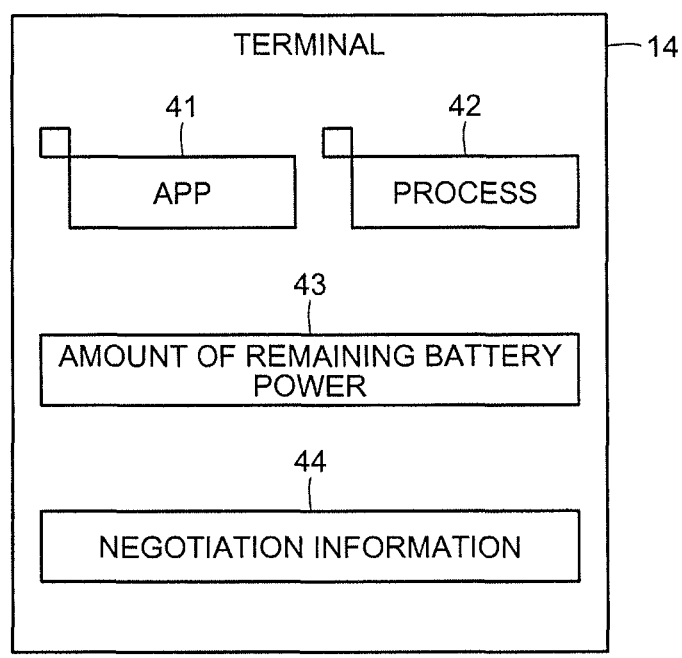
FIG. 5 is a schematic diagram of a terminal according to the second example.

FIG. 5 is a schematic diagram of the terminal according to the second example. As depicted in FIG. 5, the terminal 14 executes, for example, an application 41 or a process 42 that is assigned thereto as one of the distributed processes. The terminal 14 has information concerning the amount of remaining battery power 43 of the terminal 14 and negotiation information 44. The negotiation information 44 may be information concerning, for example, the address of the base station with which the terminal executes a negotiation (an IP address, etc.).

FIG. 6 is a flowchart of distributed processing in the scheduling method according to the second example. As depicted in FIG. 6, in the second example, the service server invokes the function of a cloud prepared by the carrier server (step S11). The form of reading and executing some of the necessary services may be referred to as "software as a service (SaaS)". An example of the function of the cloud to be invoked can be, for example, a function of searching the web.

The carrier server produces a service process; divides the produced service process into units, each for one terminal; and distributes and assigns the divided service processes to the base stations (step S12).

The base station receives the divided service processes from the carrier server; and assigns the received service processes to the terminals that are connected to the base station. In this case, the number of the service processes assigned from the carrier server may be larger than the number of terminals to which the service processes can be assigned. In such a case, the base station inquires whether an available terminal is present at the other base stations belonging to the same group and assigns the excessive service processes to the base stations having available terminals. The base stations having available terminals assign the service processes to the available connected terminals (step S13).

While the processes assigned by the base station are under execution by the terminals, the base station manages the terminals. For example, when a terminal moves to the service area of a base station in the same group, the management information of the terminal is handed over to the base station (step S14).

When a terminal completes the execution of the process, the terminal transmits processing results to the base station that is connected to the terminal. The base station receives the processing results from the terminal and transmits the received processing results to the carrier server (step S15). In this case, the base station does not need to process the processing result. The reason for this is that the carrier server divides the service process into units, each for one terminal.

The carrier server receives the processing results from the base station; consolidates the processing results received from the respective terminals into one result; converts the consolidated result into a form that is usable by the service server; and transmits the converted processing result to the service server (step S16). In this manner, the distributed processing of the service process comes to an end. The above process steps are executed each time a service process is processed by the distributed processing.

FIG. 7 is a flowchart of a registration process for the terminal in the scheduling method according to the second example. When a terminal moves into the service area of a base station, the terminal requests negotiation from the base station. The scheduler of the base station invokes the terminal management library in response to the request for negotiation.

As depicted in FIG. 7, the terminal management library newly produces an entry for the terminal in the terminal management database; and sets an ID such as the SIM information of the terminal requesting the negotiation, in the terminal ID field of the produced entry (step S21).

The terminal management library sets in the terminal management database, "assignment prohibited" in the status field of the entry for the terminal requesting the negotiation. Thereby, the status of the terminal requesting negotiation is changed to "assignment prohibited" (step S22).

The terminal management library acquires from the terminal requesting negotiation, the address (for example, the IP address) of the base station to which the terminal is currently connected (step S23). The terminal always knows the base station to which the terminal is connected.

The terminal management library sets in the terminal management database, the address of the base station acquired from the terminal into the connection destination base station field of the entry for the terminal requesting negotiation. Thereby, the connection destination base station of the terminal requesting negotiation is registered into the terminal management database (step S24). If a terminal moves into the service area of the base station from the service area of another base station, the address of the current connection destination base station of the terminal can not be acquired and therefore, the terminal management library may set a value indicating, for example, "outside the service area" in the connection destination base station field. For example, "null" may be set as the value indicating "outside the service area". The terminal management library causes the registration process for the terminal to come to an end.

FIG. 8 is a flowchart of a status updating process for the terminal in the scheduling method according to the second example. If the terminal further moves into the service area of the base station, the terminal executes handover and establishes a connection with the base station. The scheduler of the base station invokes the terminal management library in response to the handover.

For convenience of the description, the handover source base station is denoted as "base station A" and the handover destination base station is denoted as "base station B" to distinguish the base stations from each other; and the terminal management library and the terminal management database of the base station A are denoted respectively by "terminal management library A" and "terminal management database A" and those of the base station B are denoted respectively by "terminal management library B" and "terminal management database B" to distinguish the libraries and the databases from each other.

As depicted in FIG. 8, the terminal management library B acquires from the terminal management database B, the connection destination base station indicated in the entry that corresponds to the terminal that executed the handover (step S31), searches the base station database of the base station B for the connection destination base station of the terminal that executed the handover (step S32), and checks whether the corresponding base station (the base station A) is registered in the base station database of the base station B (step S33).

If the terminal management library B determines that the corresponding base station (the base station A) is registered in the base station database of the base station B (step S33: YES), the terminal management library B makes an inquiry, to the corresponding base station (the base station A), concerning the status of the terminal that executed the handover (step S34). Thereby, the handover destination base station (the base station B) can receive from the handover source base station (the base station A), the management information for the terminal that executed the handover.

If the reply to the inquiry for the status is "during processing" (step S35: YES), the terminal management library B sets in the terminal management database B, "during processing" into the status field of the entry for the terminal that executes the handover. Thereby, the status of the terminal executing the handover is changed to "during processing" (step S36).

If the reply to the inquiry for the status is a reply other than "during processing" (step S35: NO), the terminal management library B sets in the terminal management database B, "available" into the status field of the entry for the terminal that executes the handover. Thereby, the status of the terminal executing the handover is changed to "available" (step S37).

If the terminal management library B determines that the corresponding base station (the base station A) as the connection destination base station of the terminal executing the handover is not registered in the base station database of the base station B (step S33: NO), the terminal management library B sets in the terminal management database B, "available" in the status field of the entry for the terminal that executed the handover. Thereby, the status of the terminal executing the handover is changed to "available" (step S37). The same process steps are taken for the case where the terminal moves into the service area of the base station B from the outside thereof.

Following steps S36 and S37, at the connection destination base station (the base station A) of the terminal that executed the handover, the base station B registers via the terminal management library A, the address of the base station B into the connection destination base station field of the entry for the terminal that executed the handover in the terminal management database A (step S38). The terminal management library B registers in the terminal management database B, the address of the base station B into the connection destination base station field of the entry for the terminal that executes the handover (step S39). The terminal management libraries A and B of the base stations A and B cause the status updating process for the terminal to come to an end.

FIG. 9 is a flowchart of a deletion process of the terminal in the scheduling method according to the second example. As the terminal moves away from the base station to which the terminal is connected, the radio wave strength decreases. The terminal subsequently terminates the negotiation with the base station. The scheduler of the base station invokes the terminal management library in response to the termination of the negotiation. As depicted in FIG. 9, the terminal management library deletes in the terminal management database, the entry that corresponds to the terminal that terminated the negotiation (step S41) and causes the deletion process for the terminal to come to an end.

FIG. 10 is a flowchart of an assignment process for a process in the scheduling method according to the second example. The base station is assigned a process to be executed by the terminal, from the carrier server or another base station. The scheduler of the base station invokes the distributed processing library in response to the assignment of the process. For convenience of the description, the main base station is denoted by "base station C" and another base station in the same group as that of the base station C is denoted by "base station D" to distinguish the base stations from each other.

As depicted in FIG. 10, at the base station C, the distributed processing library searches the terminal management database for a terminal whose status is "available" (step S51). If the distributed processing library determines that a terminal whose status is "available" is present (step S52: YES), the distributed processing library of the base station C assigns a process to the terminal whose status is "available" (step S53).

The distributed processing library of the base station C sets in the terminal management database of the base station C, "during processing" into the status field of the entry corresponding to the terminal to which the process is assigned. Thereby, the status of the terminal to which the process is assigned is changed to "during processing" (step S54). If the distributed processing library determines that a process remains that is not yet assigned to a terminal (step S55: YES), the procedure returns to step S51 and the distributed processing library of the base station C searches for a terminal whose status is "available" among the terminals that are connected to the base station C.

If the distributed processing library determines that no terminal whose status is "available" is present among the terminals that are connected to the base station C (step S52: NO), the distributed processing library of the base station C makes an inquiry to other base stations (the base station D) registered in the base station database of the base station C, as to whether a terminal whose status is "available" is present (step S56). If the distributed processing library determines that another base station (the base station D) has a terminal whose status is "available" (step S57: YES), the distributed processing library of the base station C assigns a process to the other base station (the base station D) having the terminal whose status is "available" (step S58). The distributed processing library of the other base station (the base station D) to which the process is assigned assigns the process to the terminal whose status is "available" and that is connected to the other base station (the base station D). The distributed processing library of the base station D sets in the terminal management database of the base station D, "assignment prohibited" into the status field of the entry that corresponds to the terminal to which the process is assigned.

If the distributed processing library determines that the other base stations (the base station D) to which the inquiry is made have no terminal whose status is "available" (step S57: NO), or if the distributed processing library determines that a process remains that is not yet assigned to a terminal after the assignment of the process at step S58 comes to an end (step S55: YES), the procedure returns to step S51 and the distributed processing library of the base station C searches for a terminal whose status is "available" among the terminals that are connected to the base station C. If the distributed processing library determines that no process remains that is not yet assigned to a terminal (step S55: NO), the distributed processing library of the base station C causes the assignment process for the process to come to an end.

FIG. 11 is a flowchart of a reception process for receiving a processing result in the scheduling method according to the second example. When a terminal completes execution of the process assigned thereto, the terminal transmits the processing result to the base station to which the terminal is connected. The scheduler of the base station receives the processing result and invokes the distributed processing library.

As depicted in FIG. 11, the distributed processing library transmits to the carrier server, the processing result received from the terminal (step S61). The distributed processing library sets in the terminal management database, "available" into the status field of the entry for the terminal transmitting the processing result thereto. Thereby, the status of the terminal transmitting the processing result thereto is changed to "available" (step S62). The distributed processing library causes the reception process for the processing result to come to an end.

FIG. 12 is a flowchart of a response process for responding to an inquiry in the scheduling method according to the second example. As described, the base station may receive an inquiry, from another base station, concerning whether a terminal whose status is "available" is present (step S56) or concerning the status of the terminal (step S34). If the base station receives an inquiry from another base station, the base station invokes the inquiry response library.

As depicted in FIG. 12, the inquiry response library determines the content of the inquiry. If the inquiry response library determines that the content of the inquiry is an inquiry concerning the presence or absence of an "available" terminal (step S71: "AVAILABLE" TERMINAL), the inquiry response library searches the terminal management database for a terminal whose status is "available" (step S72). If the inquiry response library determines that the terminal whose status is "available" is present (step S73: YES), the inquiry response library notifies the base station that transmitted the inquiry, that a terminal whose status is "available" is present (step S74) and causes the response process for an inquiry to come to an end. If the inquiry response library determines that no terminal whose status is "available" is present (step S73: NO), the inquiry response library causes the response process for an inquiry to come to an end.

If the inquiry response library determines that the content of the inquiry is an inquiry concerning the status of a specific terminal (step S71: STATUS), the inquiry response library acquires from the terminal management database, the status indicated in the entry that corresponds to the terminal for which the inquiry is received (step S75) and notifies the base station that transmitted the inquiry, of the status acquired from the terminal management database (step S76).

A base station may receive from another base station, an inquiry concerning the status of a terminal, such as in a case where the terminal connected to the base station moves into the service area of the other base station that is registered in the base station database. The inquiry response library sets in the terminal management database, "assignment prohibited" into the status field of the entry that corresponds to the terminal as to which the inquiry is received. Thereby, the status of the corresponding terminal is changed to "assignment prohibited" (step S77). The inquiry response library causes the response process for an inquiry to come to an end.

FIGS. 13 and 14 are flowcharts of a collection process for collecting an assigned process in the scheduling method according to the second example. In the mobile communication system, the states of the terminals are continuously varied because the terminals move. The scheduler of a base station periodically invokes the collection library of each of the terminals that are connected to the base station; collects the parameters of the terminals; and thereby, monitors the states of the terminals. Even if no communication request is issued between the base station and the terminals, the communication therebetween is executed at specific intervals and thereby, the base station and the terminal confirm that communication is enabled therebetween. The scheduler of the base station may invoke the collection library at timings that are synchronized with the timings of the communication sessions executed at the specific intervals between the base station and the terminal. The collection library executes the collection process for the assigned process described below with respect to each of the terminals.

As depicted in FIG. 13, the collection library acquires from the terminal, the amount of remaining battery power of the terminal; further acquires from the terminal, the negotiation information of the terminal (step S81); registers in the terminal management database, the acquired amount of remaining battery power into the amount of remaining battery power field of the corresponding entry; and further registers in the terminal management database, the acquired negotiation information into the negotiation information field of the corresponding entry (step S82).

The collection library acquires the quality of the communication between the collection library and the terminal (step S83). The collection library can acquire the communication quality from, for example, the communication quality monitoring unit of the base station and registers in the terminal management database, the acquired communication quality into the communication quality field of the corresponding entry (step S84). Either one of steps S81 and S83 may be executed before the other or steps S81 and S83 may be executed simultaneously. Either one of steps S82 and S84 may be executed before the other or steps S82 and S84 may be executed simultaneously only after the corresponding information is acquired.

As depicted in FIG. 14, the collection library acquires from the terminal management database, the status, the amount of remaining battery power, the negotiation information, and the communication quality from the entry that corresponds to the terminal for which it is determined whether the process assigned thereto is to be collected (step S85). If the collection library determines that the status is not "during processing" (step S86: NO), the collection library causes the collection process for the assigned process to come to an end.

If the collection library determines that the status is "during processing" (step S86: YES), the collection library determines whether the amount of remaining battery power is low (step S87). Assuming that the fully charged state is represented by "100%", if the amount of remaining battery power is, for example, greater than or equal to 30%, it may be determined that the amount of remaining battery power is not low; and if the amount of remaining battery power is less than 30%, it may be determined that the amount of remaining battery power is low. However, a percentage other than 30% may be taken as the criterion for the determination as to whether the amount of remaining battery power is low.

If the collection library determines that the amount of remaining battery power is low (step S87: YES), the collection library collects the process that is assigned to the terminal whose amount of remaining battery power is determined as low (step S88) and sets in the terminal management database, "assignment prohibited" in the status field of the entry that corresponds to the terminal. Thereby, the status of the terminal from which the process is collected is changed to "assignment prohibited" (step S89). The collection library again assigns the process collected from the terminal to the base station (step S90) and causes the collection process for the assigned process to come to an end.

The process again assigned to the base station is assigned to a terminal that is connected to the base station and whose status is "available", as described above with reference to FIG. 10. If no terminal whose status is "available" is present among the terminals that are connected to the base station, the process again assigned to the base station is assigned to a terminal that is connected to another base station in the same group as the base station and whose status is "available".

If the collection library determines that the amount of remaining battery power is not low (step S87: NO), the collection library determines whether the communication quality is poor (step S91). A threshold value that is for the communication quality and used to determine whether a terminal is to execute handover may be used as a criterion to determine the communication quality, for example. If the collection library determines that the communication quality is not poor (step S91: NO), the collection library causes the collection process for the assigned process to come to an end.

If the collection library determines that the communication quality is poor (step S91: YES), the collection library searches the base station database for the base station indicated by the negotiation information (step S92). If the collection library determines that the base station indicated by the negotiation information is registered in the base station database (step S93: YES), the collection library causes the collection process for the assigned process to come to an end. If the collection library determines that the base station indicated by the negotiation information is not registered in the base station database (step S93: NO), the collection library collects the process from the terminal for which the collection library determines that the communication quality therefor is poor (step S88), changes the status of the terminal to "assignment prohibited" (step S89), again assigns the collected process to the base station (step S90), and causes the collection process of the assigned process to come to an end. A case where the collection library determines at step S93 that the base station indicated by the negotiation information is not registered in the base station database includes a case where the terminal does not execute negotiation. Configuration may be such that the communication quality is determined first and thereafter, the amount of remaining battery power may be determined.

FIG. 15 is a schematic diagram of an example of the terminal management database for the collection of the process in the scheduling method according to the second example. In FIG. 15, the base stations A and B are those as described with reference to FIG. 8 above (and the same applies to FIG. 16). FIG. 15 depicts the terminal management database without a terminal ID field (and the same applies to FIG. 16). In the example depicted in FIG. 15, it is assumed that the base stations A and B respectively belong to different groups from one another, and that the amount of remaining battery power of a terminal is sufficient. In the description below, the values of the amount of remaining battery power and those of the communication quality are merely examples, and may be other values.

In each of the terminal management databases of the base stations A and B, an entry registered for a terminal that communicates only with the base station A is as follows. In the terminal management database of the base station A: the status, the connection destination base station, the negotiation information, the amount of remaining battery power, and the communication quality of the entry corresponding to the terminal are, respectively, "during processing"; the address of the base station A; the address of the base station A; for example, 80%; and for example, 10 Mbps (reference numeral "51" in FIG. 15). Hereinafter, description similar hereto will be indicated as "for entry 51 in the terminal management database of the base station A, the status: "during processing", the connection destination base station: the base station A, the negotiation information: the base station A, the amount of remaining battery power: for example, 80%, and the communication quality: for example, 10 Mbps". In the terminal management database of the base station B, no entry is present that corresponds to the terminal (reference numeral "52" in FIG. 15). Hereinafter, description similar hereto will be indicated as "for entry 52 in terminal management database of the base station B, no entry present".

The terminal, moving within the service area of the base station A, starts negotiation with the base station B when the terminal reaches a location close to the border between the base stations A and B. In this state, in each of the terminal management databases of the base stations A and B, the entry that corresponds to the terminal is as follows.

For entry 53 in terminal management database of the base station A, the status: "during processing", the connection destination base station: the base station A, the negotiation information: the base station B, the amount of remaining battery power: for example, 80%, and the communication quality: for example, 3 Mbps.

For entry 54 in terminal management database of the base station B, the status: "assignment prohibited", the connection destination base station: the base station A, the negotiation information: not registered, the amount of remaining battery power: not registered, and the communication quality: not registered.

If the communication quality further drops between the base station A and the terminal, the base station A collects the process that is assigned to the terminal. In this state, in each of the terminal management databases of the base stations A and B, the entry that corresponds to the terminal is as follows.

For entry 55 in terminal management database of the base station A, the status: "assignment prohibited", the connection destination base station: the base station A, the negotiation information: the base station B, the amount of remaining battery power: for example, 80%, and the communication quality: for example, 1 Mbps.

For entry 56 in terminal management database of the base station B, the status: "assignment prohibited", the connection destination base station: the base station A, the negotiation information: the base station B, the amount of remaining battery power: for example, 80%, and the communication quality: for example, 1 Mbps.

In each of the terminal management databases of the base stations A and B, the entry that corresponds to the terminal when the handover occurs is as follows.

For entry 57 in terminal management database of the base station A, the status: "assignment prohibited", the connection destination base station: the base station B, the negotiation information: the base station B, the amount of remaining battery power: for example, 80%, and the communication quality: for example, 0.1 Mbps.

For entry 58 in terminal management database of the base station B, the status: "available", the connection destination base station: the base station B, the negotiation information: the base station B, the amount of remaining battery power: for example, 80%, and the communication quality: for example, 3 Mbps.

If the communication is disconnected between the terminal and the base station A, the base station A deletes from the terminal management database thereof, the entry that corresponds to the terminal and thus, no entry is present. In each of the terminal management databases of the base stations A and B, the entry that corresponds to the terminal when the communication is disconnected between the terminal and the base station A is as follows.

For entry 59 in terminal management database of the base station A, no entry present.

For entry 60 in terminal management database of the base station B, the status: "available", the connection destination base station: the base station B, the negotiation information: the base station B, the amount of remaining battery power: for example, 80%, and the communication quality: for example, 10 Mbps.

FIG. 16 is a schematic diagram of an example of the terminal management database for a case where the process is not collected in the scheduling method according to the second example. It is assumed for the example depicted in FIG. 16 that the base stations A and B both belong to the same group and that the amount of remaining battery power of the terminal is sufficient. In the description below, the values of the amount of remaining battery power and those of the communication quality are merely examples, and may be other values.

In each of the terminal management databases of the base stations A and B, the entry that corresponds to the terminal when the terminal communicates only with the base station A is as follows.

For entry 71 in the terminal management database of the base station A, the status: "during processing", the connection destination base station: the base station A, the negotiation information: the base station A, the amount of remaining battery power: for example, 80%, and the communication quality: for example, 10 Mbps.

For entry 72 in the terminal management database of the base station B, no entry present.

The terminal, moving within the service area of the base station A, starts negotiation with the base station B when the terminal reaches a location close to the border between the base stations A and B. In this state, in each of the terminal management databases of the base stations A and B, the entry that corresponds to the terminal is as follows.

For entry 73 in the terminal management database of the base station A, the status: "during processing", the connection destination base station: the base station A, the negotiation information: the base station B, the amount of remaining battery power: for example, 80%, and the communication quality: for example, 3 Mbps.

For entry 74 in the terminal management database of the base station B, the status: "assignment prohibited", the connection destination base station: the base station A, the negotiation information: not registered, the amount of remaining battery power: not registered, and the communication quality: not registered.

Because the base stations A and B both belong to the same group, the base station A does not collect the process assigned to the terminal even if the communication quality further drops between the base station A and the terminal. The process assigned to the terminal is handed over from the base station A to the base station B. In this state, in each of the terminal management databases of the base stations A and B, the entry that corresponds to the terminal is as follows.

For entry 75 in the terminal management database of the base station A, the status: "during processing", the connection destination base station: the base station A, the negotiation information: the base station B, the amount of remaining battery power: for example, 80%, and the communication quality: for example, 1 Mbps.

For entry 76 in the terminal management database of the base station B, the status: "assignment prohibited", the connection destination base station: the base station A, the negotiation information: the base station B, the amount of remaining battery power: for example, 80%, and the communication quality: for example, 1 Mbps.

In each of the terminal management databases of the base stations A and B, the entry that corresponds to the terminal when the handover occurs is as follows.

For entry 77 in the terminal management database of the base station A, the status: "during processing", the connection destination base station: the base station B, the negotiation information: the base station B, the amount of remaining battery power: for example, 80%, and the communication quality: for example, 0.1 Mbps.

For entry 78 in the terminal management database of the base station B, the status: "during processing", the connection destination base station: the base station B, the negotiation information: the base station B, the amount of remaining battery power: for example, 80%, and the communication quality: for example, 3 Mbps.

When communication is disconnected between the terminal and the base station A, the base station A deletes from the terminal management database, the entry that corresponds to the terminal and thus, no entry is present. In each of the terminal management databases of the base stations A and B, the entry that corresponds to the terminal when the communication is disconnected between the terminal and the base station A is as follows.

For entry 79 in the terminal management database of the base station A, no entry present.

For entry 80 in the terminal management database of the base station B, the status: "during processing", the connection destination base station: the base station B, the negotiation information: the base station B, the amount of remaining battery power: for example, 80%, and the communication quality: for example, 10 Mbps.

According to the second example, when the terminal moves in the plural service areas managed by the plural base stations that belong to the same group, the process assigned to the terminal is not collected from the terminal and the same terminal continues the execution of the process. Therefore, no overhead is generated to collect and reassign the process. Consequently, drops in efficiency can be suppressed when plural terminals execute distributed processing.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method for a first base station, wherein the first base station including
    a first terminal management memory storing states of process assignment of terminals managed by the first base station and
    a base station memory storing information concerning other base stations that are connected to a same relaying station as the first base station and that belong to a same group as the first base station, and
the scheduling method comprising:
    searching, by the first base station, the first terminal management memory of the first base station, for a first terminal for which a first status indicating available is set in the first terminal management memory and that communicates with the first base station;
    assigning, by the first base station, a process to the first terminal retrieved at the searching for the first terminal;
    communicating, by the first base station, with a second base station registered in the base station memory and searching for a second terminal for which the first status is set and that is managed by the second base station, when at the searching for the first terminal, no first terminal is retrieved; and
    assigning, by the first base station, the process to the second terminal.

2. The scheduling method according to claim 1, further comprising
    setting in the first terminal management memory when the process is assigned to the first terminal, a status of the first terminal to be a second status indicating that the process is currently under execution.

3. The scheduling method according to claim 1, further comprising
    setting in second terminal management memory corresponding to the second base station, a status of the second terminal to be a third status indicating that process assignment to the second terminal is prohibited, the status of the second terminal being set to the third status when the second terminal is retrieved.

4. The scheduling method according to claim 1, further comprising:
    acquiring, by the first base station, from a third terminal that is moving into a service area of the first base station, information concerning a third base station communicating with the third terminal;
    first setting, by the first base station, in the first terminal management memory, a status of the third terminal to be the first status, when the information concerning the third base station is not registered in the base station memory; and
    second setting, by the first base station, in the first terminal management memory, the status of the third terminal acquired from the third base station, when the information concerning the third base station is registered in the base station memory.

5. The scheduling method according to claim 4, wherein the second setting includes setting in the first terminal management memory, the status of the third terminal to be the first status, when the status of the third terminal acquired from the third base station is not the second status indicating that the third terminal is currently executing a process.

6. The scheduling method according to claim 1, further comprising
    registering in the first terminal management memory when a third terminal moves into a service area of the first base station, information concerning the third terminal.

7. The scheduling method according to claim 1, further comprising
    deleting from the first terminal management memory, information concerning a third terminal when the third terminal leaves a service area of the first base station.

8. The scheduling method according to claim 1, wherein the first base station assigns a radio channel between the first base station and a terminal.

9. The scheduling method according to claim 1, wherein, when the second terminal for which the first status is set is searched, the first base station assigns the process to the second base station and the second base station assigns the process to the second terminal.

* * * * *